No. 790,723. PATENTED MAY 23, 1905.
W. W. CLARK.
TRACTION ATTACHMENT FOR VEHICLES.
APPLICATION FILED SEPT. 28, 1904.
2 SHEETS—SHEET 1.
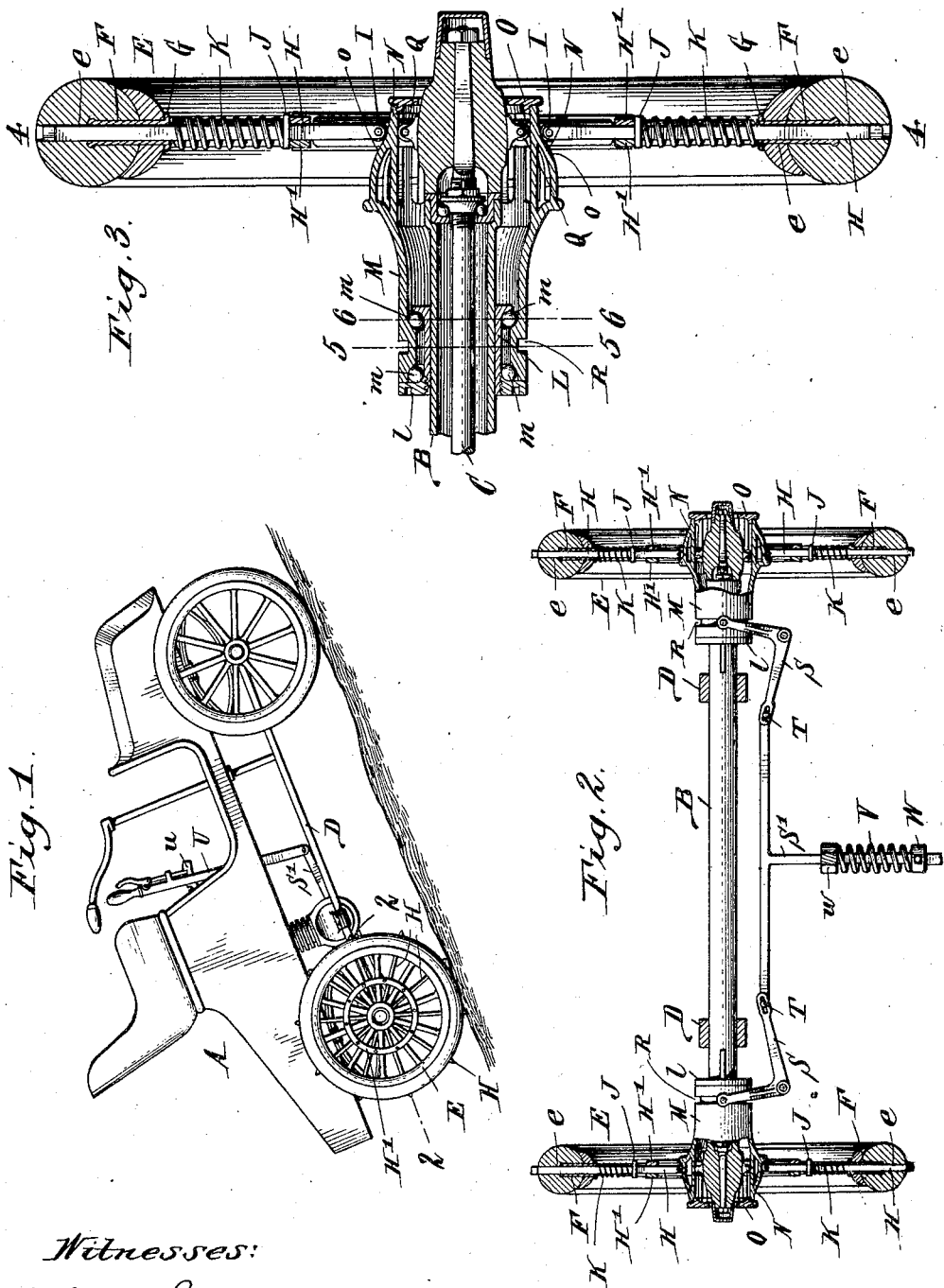
Witnesses:
Julius Lankes
Edwin Maier
Willie W. Clark, Inventor.
By Neuhart & Burkhart,
Attorneys.

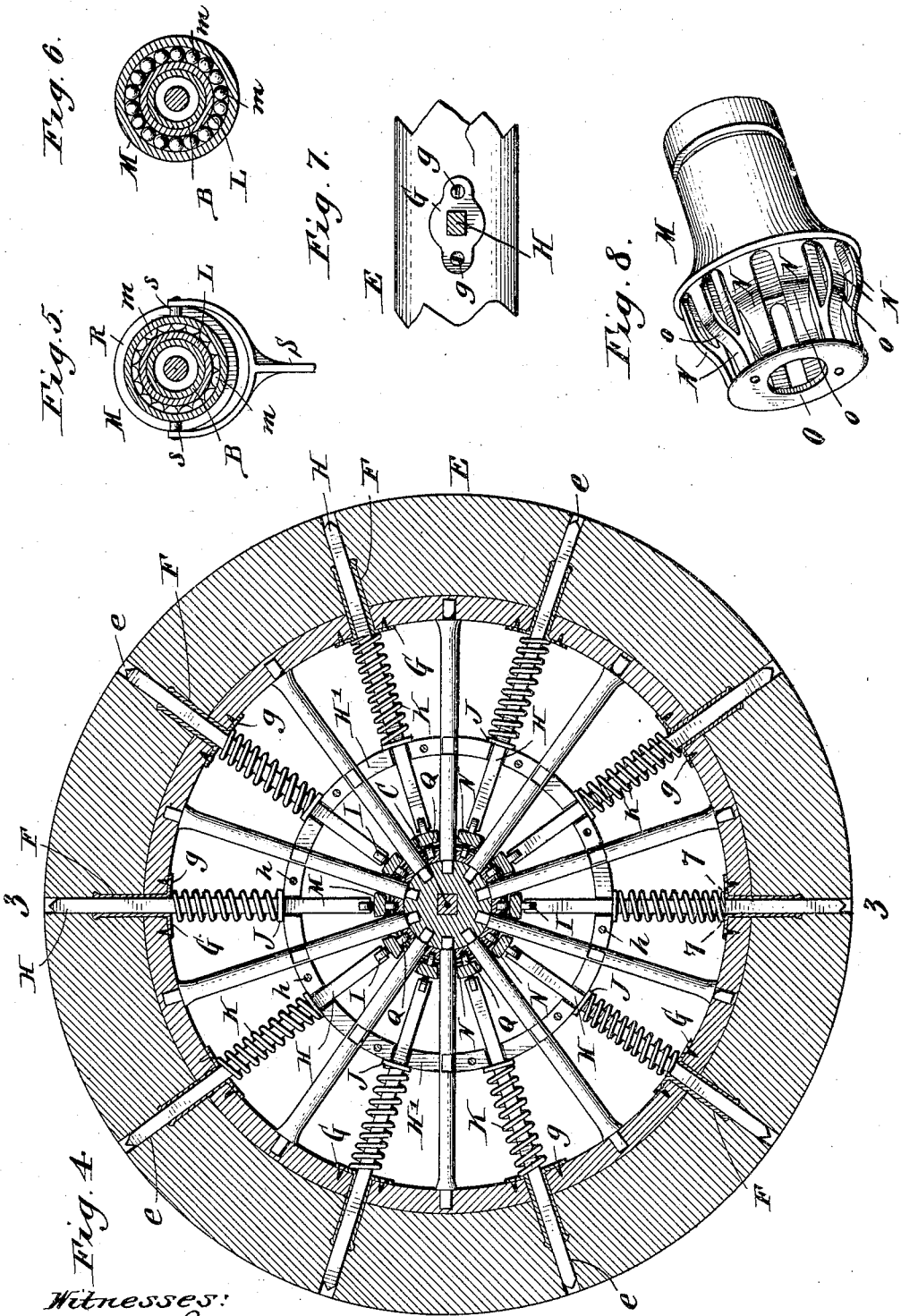

No. 790,723. Patented May 23, 1905.

UNITED STATES PATENT OFFICE.

WILLIE W. CLARK, OF BUFFALO, NEW YORK.

TRACTION ATTACHMENT FOR VEHICLES.

SPECIFICATION forming part of Letters Patent No. 790,723, dated May 23, 1905.

Application filed September 28, 1904. Serial No. 226,370.

*To all whom it may concern:*

Be it known that I, WILLIE W. CLARK, a citizen of the United States, residing at Buffalo, in the county of Erie and State of New York, have invented certain new and useful Improvements in Traction Attachments for Vehicles, of which the following is a specification.

This invention relates to vehicles, but more particularly to the traction mechanism thereof. Its object is to provide simple and effective means whereby the traction of a vehicle may be increased when desired, as when going up hill or traveling on slippery roads.

The invention consists, broadly, in the combination, with the vehicle-wheel and a radial series of spurs or prongs held between the spokes of the wheel and extending through the wheel-felly and into apertures in the tire, of means for simultaneously projecting these spurs beyond the periphery of the wheel and rigidly holding them in their projected positions.

It further consists in the means whereby the spurs may be simultaneously retracted and in the various details of construction shown and hereinafter described.

In the drawings, Figure 1 represents a side view of an automobile provided with the traction mechanism. Fig. 2 is a section taken on line 2 2, Fig. 1, with the forward end of the operating-rod broken away. Fig. 3 is a vertical section taken on line 3 3, Fig. 4. Fig. 4 is an enlarged vertical section taken on line 4 4, Fig. 3. Fig. 5 is a vertical transverse section taken on line 5 5, Fig. 3. Fig. 6 is a similar section taken on line 6 6, Fig. 3. Fig. 7 is an enlarged horizontal section taken on line 7 7, Fig. 4, showing an inner view of a portion of the wheel-felly. Fig. 8 is a detached perspective view of the longitudinally-slotted shifting sleeve.

Referring to the drawings in detail, similar letters of reference refer to similar parts in the several figures.

A designates the vehicle as a whole, herein shown as an automobile; but it is to be understood that my improved device may be applied to other styles of vehicles, though it is particularly intended for use with the driving-wheels of motor-cars.

B designates the usual hollow axle of automobiles, which incloses the driving-shaft C and is held rigid in the reach-rods D or in any other manner.

The driving-wheels E are affixed to the shaft C, so as to revolve therewith, and each wheel has its felly and tire perforated at points between the spokes, as at $e$, for the reception of metallic thimbles or sleeves F, which are driven into the perforations from the inner side of the felly and extend partly into the tire. Each sleeve has its inner end flanged, as at G, through which screws $g$ are passed, which screw into the felly and securely hold the sleeves in place. The spurs are arranged radially between the spokes of the wheel with their outer ends held normally in the perforations, the extremities being a slight distance from the outer periphery of the tire to permit the latter to yield under the weight of the vehicle without exposing the spurs. The spurs are guided in the sleeves F and between two annular guide-strips H', which are held against the spokes by bolts $h$, passing through the same. The inner ends of the spurs are provided with rollers I, which are engaged by shifting mechanism to be hereinafter described, whereby the spurs are projected for contact with the road. Each spur is provided with a collar J, between which and the sleeves F spiral springs K, that surround the spurs, are interposed, said springs acting against the collars to hold the spurs in their normal or retracted positions.

Splined to the hollow axle near opposite ends, so as to slide thereon, are cone-sleeves L, each having a cone $l$ threaded on its inner end. A shifting sleeve M surrounds each end of the axle and the hub of the adjacent wheel, and between the same and the cones $l$ are antifriction-balls $m$. Each shifting sleeve is slotted at its outer end to form a series of arms N, which extend outward between the spokes of the wheels. The outer ends of said arms are threaded on the inner side to receive an annulus O, which prevents the withdrawal of the shifting sleeve from its position around the hub. The outer faces of said arms are inclined upward and rearward to form wedge-faces, which are moved underneath the rollers at the inner ends of the spurs on shifting the sleeves to force said spurs outward for the purpose of increasing the traction. As a further aid to the free movement of the shifting sleeve I provide rollers Q, which are located between the arms of the shifting sleeve and the hubs of the wheels. Each roller is journaled in a bracket secured to the hub.

From the foregoing it is apparent that the shifting sleeves revolve with the wheels, and the spurs are projected by outward movement of the sleeves on the axle. It is therefore necessary that provision be made to shift the sleeve without interference to its revolving motion. To this end I provide each sleeve, at the inner end thereof, with an annular groove R, in which rollers *s* are positioned, which are secured to the fork-arms of forked bell-crank levers S, pivoted to a fixed part of the vehicle, the free ends of said levers being connected to a T-rod S', whose ends are provided with studs T, working in slots in said free ends of the bell-crank levers. Said T-rod is operated by a hand-lever U, standing within the body of the vehicle, and when said T-rod is moved backward the outer ends of said bell-crank levers are moved outward, carrying the shifting sleeve outward and simultaneously projecting the spurs. The T-rod is restored to its normal position by a coil-spring V, surrounding said rod and lying between a collar W, rigidly attached to the rod and a projection *w* on the vehicle-body. A quadrant *u* locks the hand-lever at any desired point.

Having thus described my invention, what I claim is—

1. The combination with a vehicle-wheel, of a radial series of spurs having their outer ends normally within the periphery of the wheel, and horizontal wedge-arms lying between the spokes of the wheel and being adapted to force the spurs outward to project the outer ends of the same beyond the periphery of the wheel.

2. The combination with the axle and the vehicle-wheel, of a radial series of spurs located between the spokes of the wheel with the outer ends passed through the felly and entering the tire thereof, and a shifting sleeve surrounding the axle and having outwardly-extending arms lying between the spokes, said arms having inclined outer faces adapted to act against the inner ends of the spurs to project the outer ends of the same beyond the periphery of the wheel.

3. The combination with the axle and the vehicle-wheel, of a radial series of spurs located between the spokes of the wheel with the outer ends passed through the felly and entering the tire thereof, and a shifting sleeve surrounding the axle and having outwardly-extending wedge-arms lying between said spokes, said arms being connected at their outer ends to prevent displacement of the sleeve and adapted to act against the inner ends of the spurs to project the outer ends of the same beyond the periphery of the wheel.

4. The combination with the axle and the vehicle-wheel, of a radial series of spurs located between the spokes of the wheel with the outer ends passed through the felly and entering the tire thereof, a shifting sleeve surrounding the axle and having outwardly-extending wedge-arms lying between said spokes, and an annulus threaded on the outer ends of said wedge-arms, the latter being adapted to act against the inner ends of the spurs to project the outer ends of the same beyond the periphery of the wheel.

5. The combination with a vehicle-wheel, of a radial series of spurs having their outer ends normally within the periphery of the wheel and each provided with a roller at its inner end, and a longitudinally-movable shifting sleeve surrounding the hub of the wheel and having wedge-arms lying between the spokes of the wheel and in contact with the said rollers.

6. The combination with a vehicle-wheel, of a radial series of spurs having their outer ends normally within the periphery of the wheel and each provided with a roller at its inner end, a longitudinally-movable shifting sleeve having inclined wedge-arms between the spokes of the wheel, and rollers between said wedge-arms and said hub.

In testimony whereof I have affixed my signature in the presence of two subscribing witnesses.

WILLIE W. CLARK.

Witnesses:
M. SERVERT,
CHAS. F. BURKHART.